(12) United States Patent
Beeck

(10) Patent No.: US 8,176,720 B2
(45) Date of Patent: May 15, 2012

(54) AIR COOLED TURBINE COMPONENT HAVING AN INTERNAL FILTRATION SYSTEM

(75) Inventor: Alexander R. Beeck, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 295 days.

(21) Appl. No.: 12/564,166

(22) Filed: Sep. 22, 2009

(65) Prior Publication Data

US 2011/0067409 A1    Mar. 24, 2011

(51) Int. Cl.
*F02G 3/00* (2006.01)
(52) U.S. Cl. ............. 60/39.092; 60/806; 415/121.2
(58) Field of Classification Search ........... 60/39.091, 60/39.092, 806; 415/115, 121.2; 416/90 R, 416/92, 96 A, 96 R, 97 R
See application file for complete search history.

(56) References Cited

U.S. PATENT DOCUMENTS

| 3,720,045 | A * | 3/1973 | Murphy ................. 55/306 |
| 4,309,147 | A * | 1/1982 | Koster et al. .............. 416/95 |
| 5,039,317 | A * | 8/1991 | Thompson et al. ......... 95/272 |
| 7,326,031 | B2 * | 2/2008 | O'Neill et al. ........... 415/121.2 |
| 7,390,167 | B1 * | 6/2008 | Bouiller et al. ........... 416/96 R |
| 7,555,892 | B2 * | 7/2009 | Vosberg ................ 60/39.53 |
| 7,665,965 | B1 * | 2/2010 | Liang ..................... 416/1 |
| 7,967,554 | B2 * | 6/2011 | Bremer ................. 415/121.2 |
| 2008/0310951 | A1 | 12/2008 | Bremer |

* cited by examiner

*Primary Examiner* — William H Rodriguez
*Assistant Examiner* — Phutthiwat Wongwian

(57) ABSTRACT

A centrifugal particle separator is provided for removing particles such as microscopic dirt or dust particles from the compressed cooling air prior to reaching and cooling the turbine blades or turbine vanes of a turbine engine. The centrifugal particle separator structure has a substantially cylindrical body with an inlet arranged on a periphery of the substantially cylindrical body. Cooling air enters centrifugal particle separator through the separator inlet port having a linear velocity. When the cooling air impinges the substantially cylindrical body, the linear velocity is transformed into a rotational velocity, separating microscopic particles from the cooling air. Microscopic dust particles exit the centrifugal particle separator through a conical outlet and returned to a working medium.

14 Claims, 4 Drawing Sheets

AIR COOLED TURBINE COMPONENT HAVING AN INTERNAL FILTRATION SYSTEM

Development for this invention was supported in part by Contract No. DE-FC26-05NT42646 awarded by the United States Department of Energy. Accordingly, the United States Government may have certain rights in this invention.

TECHNICAL FIELD

This disclosure relates to the field of cooled components for use in an industrial gas turbine engine. More particularly, this disclosure relates to the use of a centrifugal particle separator within a cooling circuit of an air cooled turbine component to remove microscopic particles from ingested cooling air.

BACKGROUND

Typically, gas turbine engines include a compressor for compressing air, a combustor for mixing the compressed air with fuel and igniting the mixture, and a turbine blade assembly for producing power. Combustors often operate at high temperatures that may exceed 2,500 degrees Fahrenheit. Typical turbine combustor configurations expose turbine vane and blade assemblies to these high temperatures. As a result, turbine blades, vanes, and combustion components must be made of materials capable of withstanding such high temperatures. In addition, turbine blades, vanes, and combustion components often contain cooling systems for prolonging the life of the blades and vanes, reducing the likelihood of failure as a result of excessive temperatures.

Typically, turbine blades are formed from a root portion and a platform at one end and an elongated portion forming a blade that extends outwardly from the platform. The blade is ordinarily composed of a tip opposite the root section, a leading edge, and a trailing edge. Turbine vanes are typically formed from an elongated portion forming a blade that extends between two platforms, one platform on each end. Conventional turbine blades and vanes have many different designs of internal cooling systems. Generally, the inner aspects of most turbine blades and vanes typically contain an intricate maze of cooling channels forming a cooling system, or cooling network and these components exposed to hot combustion gases are cooled by passing a cooling fluid, such as compressed air bled from a compressor of the gas turbine, through a hollow interior of the component. Cooling air from the compressor of the gas turbine engine is passed through the blades and vanes, and they are cooled convectively. Because the cooling air coming from the compressor is unfiltered, it often includes a multitude of microscopic particles such as dust or dirt. The cooling channels, which often include multiple flow paths that are designed to maintain all aspects of the turbine blade or vane at a relatively uniform temperature have been sufficiently large to pass the microscopic particles.

As cooling technology improves, as well as the high temperature metallurgical properties of many of the materials used to fabricate cooled turbine components, the volume of cooling air required for cooling is decreased which ultimately leads to an overall increase in efficiency of the gas turbine engine. With the decrease in volume of cooling flow circulating through the cooling maze, a reduction in the cooling channel size is realized. However, ingestion of microscopic particles poses one of the most significant limitations to turbine engine component cooling effectiveness and durability. The microscopic particles routed through cooling passages in the turbine blades and vanes can accumulate over time blocking the cooling air flow and cover the surfaces with an insulating particle layer that reduces cooling effectiveness. Additionally, any corrosive substances in the particles may chemically react with the base alloy at the high turbine operating temperatures, thereby corroding the surfaces. Over time, continued particle accumulation can lead to failure of the turbine blades and vanes. The most common symptom of such component failure is a large performance decrease, resulting in premature removal of the engine for low power output. Occasionally, symptoms are not observed until there is a failure of the turbine with extensive secondary damage to the engine resulting in high repair cost. Thus, an internal cooling system having an increased ability to filter microscopic particles from cooling air flow is needed.

SUMMARY

Briefly described, the present disclosure, in a preferred embodiment thereof, is an air cooled turbine component for use in a gas turbine engine, such as a turbine blade, a turbine vane, or cooled combustion components, having a centrifugal particle separator for filtering microscopic particles from cooling air flow. The turbine component will generally have a cooling air inlet where a volume of cooling air enters a cooling network. The cooling network is comprised of a circuitous network of cooling channels arranged within the component. A centrifugal particle separated is arranged proximate the cooling air inlet and is configured to receive the volume of cooling air after entering the cooling network. The centrifugal particle separator has a substantially cylindrical body with a separator inlet arranged on a periphery of the substantially cylindrical body. Cooling air having a linear velocity enters centrifugal particle separator through the separator inlet port. When the cooling air impinges the substantially cylindrical body, the linear velocity is transformed into a rotational velocity, separating microscopic particles from the cooling air. A conical portion is arranged near one end of the centrifugal particle separator and an outlet tube is arranged near another end. An unfiltered portion of cooling air, i.e. cooling air containing microscopic particulate above a threshold size to be filtered by the centrifugal particle separator, exits the cooled component through an air outlet, adjacent the conical section, where it is re-introduced with a working medium while the filtered portion of cooling air, i.e. cooling air containing microscopic particulate below a threshold size to be filtered by the centrifugal particle separator, continues through the cooling network exiting the centrifugal particle separator through the outlet tube.

In another aspect, a method is disclosed for cooling a component for a combustion turbine engine. The method includes the following steps:

(a) introducing a quantity of cooling air containing particulate into an inlet of a cooling flow circuit of the component;

(b) arranging a centrifugal particle separator in the cooling flow circuit to receive the quantity of cooling air and remove a portion of the particulate having at least a minimum particulate size from the quantity of cooling air, wherein the centrifugal particle separator comprises a first end and a second end;

(c) exhausting the unfiltered particulate and a portion of the quantity of cooling air from the first end of the centrifugal particle separator and out of the component; and (d) exhausting the remaining quantity of cooling air and filtered particulate from the second end to the cooling flow circuit, wherein the cooling air circuit is comprised of a plurality of channels having a cross sectional size reduced by an amount proportional to the minimum particulate size removed from the filtered portion of cooling air, thereby reducing the amount of cooling air required.

In yet another aspect, a combustion turbine engine having a compressor element, a combustion element, and a turbine element is disclosed. The turbine element comprises a plurality of air cooled components with at least one of the air cooled components incorporating a centrifugal particle separator within the cooling network, as discussed above.

Accordingly, a centrifugal, or centrifugal particle separator arranged internal to an air cooled turbine component that addresses successfully the problems and shortcomings of the prior art by providing an improved means of filtering microscopic particles from cooling air thereby enabling cooling channels in the cooling flow network to be reduced in size is disclosed. These and other features, objects, and advantages will be better understood upon review of the detailed description presented below taken in conjunction with the accompanying drawing figures, which are briefly described as follows.

BRIEF DESCRIPTION OF THE DRAWINGS

The present disclosure is now described with respect to the embodiments seen in following drawings. According to common practice, the various features of the drawings discussed below are not necessarily drawn to scale. Dimensions of various features and elements in the drawings may be expanded or reduced to illustrate more clearly the embodiments of the disclosure.

DETAILED DESCRIPTION OF THE PREFERRED EMBODIMENTS

The following detailed description of the disclosed embodiments is merely exemplary in nature and is not intended to limit the embodiments or the application and uses of the embodiments. Furthermore, there is no intention to be bound by any theory presented in the preceding background of the invention or the following detailed description of the embodiments. It is to be appreciated that the described embodiment is not limited to use in conjunction with a particular type of turbine engine, or even to use in a turbine. Thus, although the present embodiment is, for convenience of explanation, depicted and described as being implemented in an air cooled turbine blade of the turbine engine, it will be appreciated that it can be implemented in various other types of turbines or industrial machinery, various types of cooled turbine components, such as turbine vanes and combustion transition pieces, and in various other systems and environments.

Figure 1:
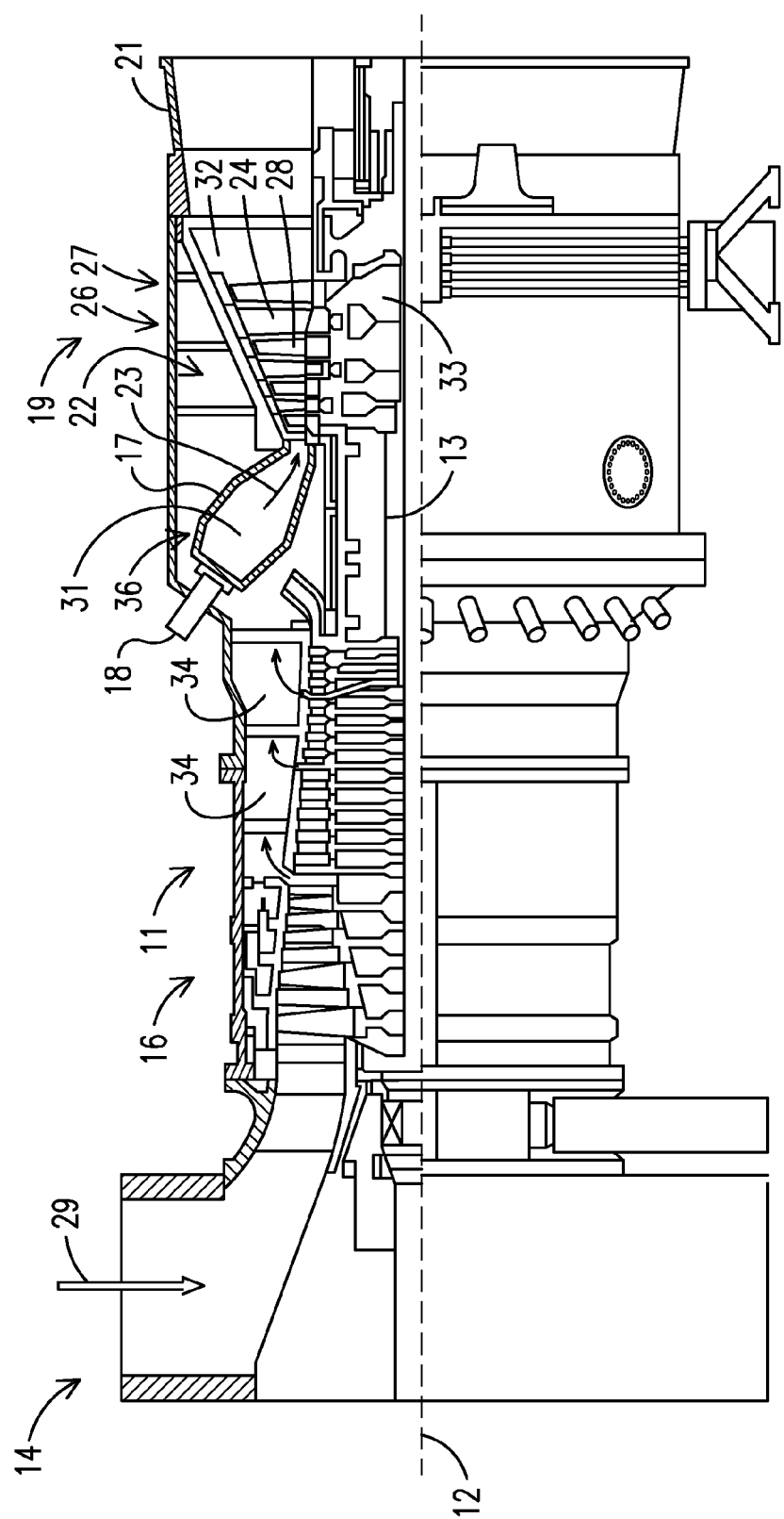
FIG. 1 is a cross section view of has turbine engine according to aspects of the present disclosure.

FIG. 1 shows a shows a longitudinal section of a typical gas turbine 11. Inside, it has a rotor 13 on bearings that allow it to spin about its axis of rotation 12. Arranged along the rotor are an intake casing 14, a compressor 16, an annular combustion chamber 17 with several coaxially arranged burners 18, a turbine 19 and the waste gas casing 21. The combustion chamber 17 forms a combustion area 31 that communicates with an annular hot gas path 32. Four turbine stages 22 arranged one after the other form the turbine 19. Each turbine stage 22 comprises two rings of blades. In the direction of flow of a working medium 23, a row 27 of rotor-blades 28 follows a row of turbine vanes 26 in the hot gas path 32. The turbine vanes 24 are attached to the stator 26, whereas the rotor blades 28 of one row 27 are attached to the rotor 13 by means of a turbine disk 33. Coupled to the rotor 13 is a generator or a driven machine (not shown).

During operation of the gas turbine 11, air 29 is drawn in through the intake casing 14 and compressed by the compressor 16. The compressed air made available at the turbine end of the compressor 16 is fed to the burners 18 where it is mixed with a fuel. The mixture is then burned in the combustion area 31, forming the working medium 23. From there, the working medium 23 flows along the hot gas duct 32 past the turbine vanes 24 and the rotor blades 28. At the rotor blades 28, the working medium 23 expands, sending a pulse that causes the rotor blades 28 to drive the rotor 13 and the rotor 13 to drive the connected machine.

The components exposed to the hot working medium 23 are subject to enormous thermal loads during operation of the gas turbine 11. The turbine vanes 24 and the rotor blades 28 of the first turbine stage 22 in the direction of flow of the working medium 23 are exposed to the greatest thermal stress, along with the thermal shield stones cladding the combustion chamber 17. To withstand the temperatures that these components are exposed to in the combustion system 36 the turbine 19, they are oftentimes cooled with a coolant, which is usually cooling air 34 bled from various locations in the compressor 16.

Figure 2:
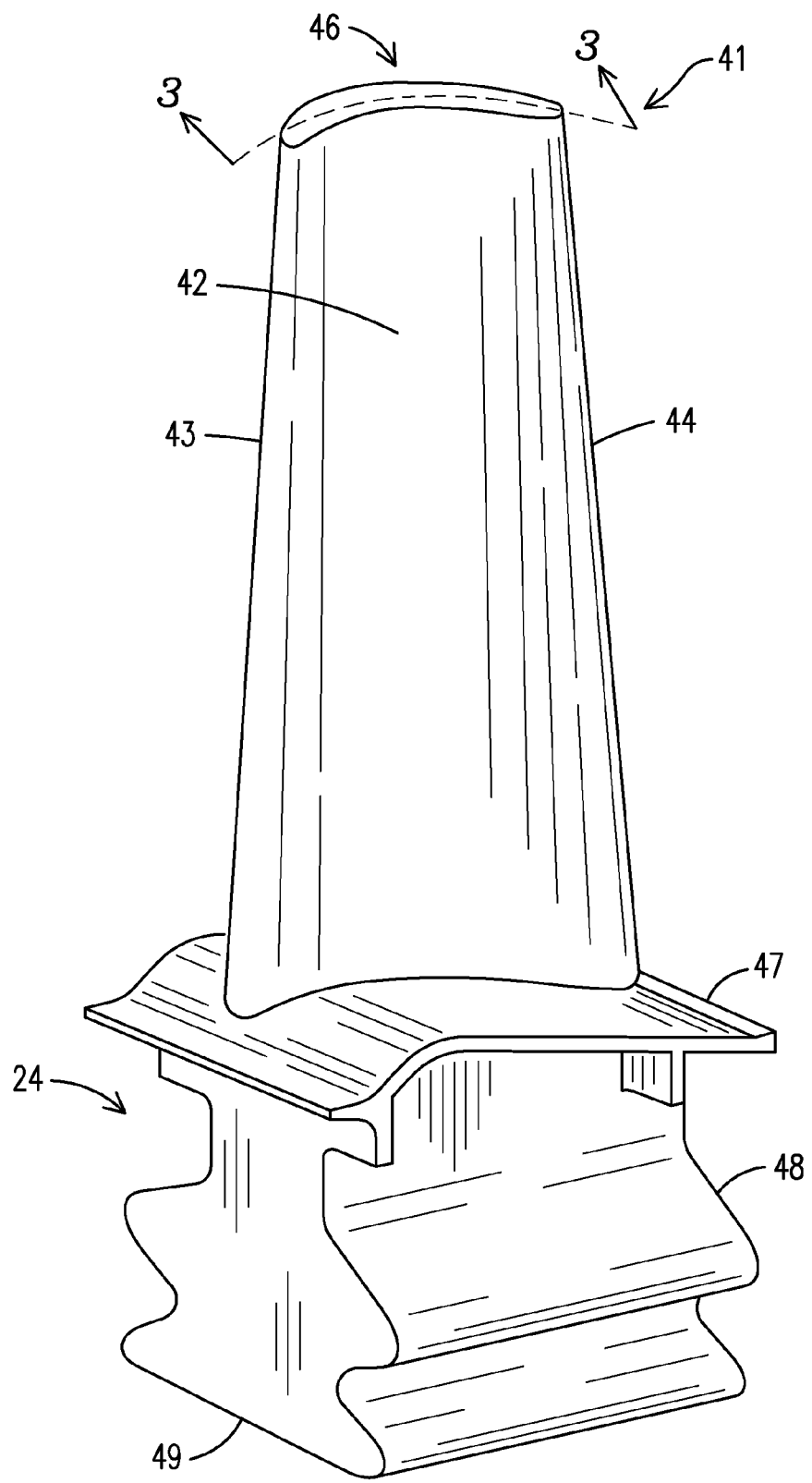
FIG. 2 is a perspective view of an air cooled gas turbine blade having internal cooling channels.
Figure 3:
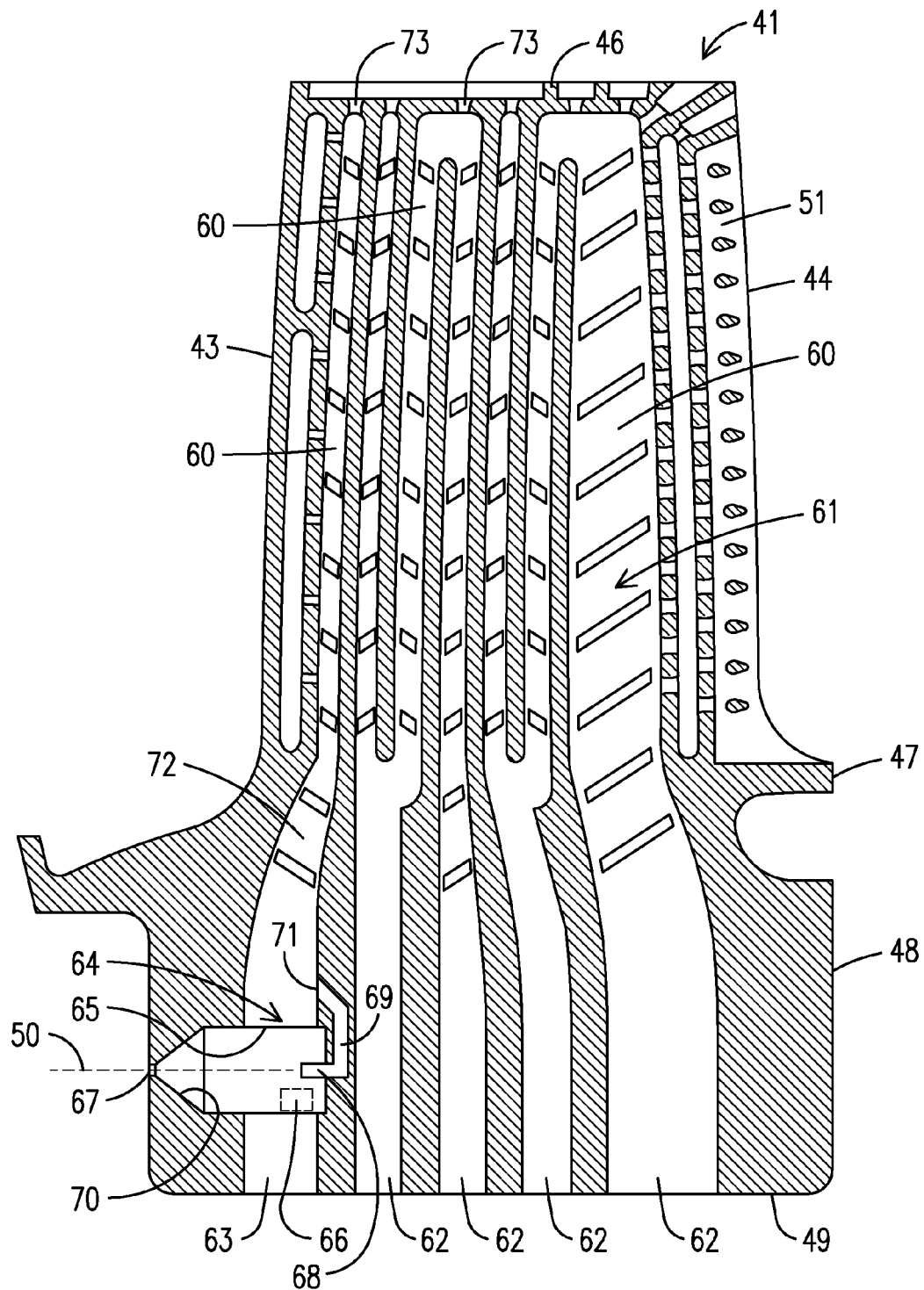
FIG. 3 is a cross section view of the air cooled gas turbine blade of FIG. 2, taken along section line 3-3, that embodies a centrifugal particle separator arranged within the turbine blade and in a cooling flow channel.

As shown in FIG. 2, this invention is directed to a filtration system (see FIG. 3) usable within a turbine blade 41, which is a turbine blade 41 that can be used in any of the turbine stages of a gas turbine engine 11. In one embodiment, the turbine blade 41 may include a generally elongated blade 42 having a leading edge 43, a trailing edge 44, a tip 46, and a platform 47 that is positioned generally orthogonal to the generally elongated blade 42 and located at an end of the generally elongated blade 42 opposite the tip 46. The trailing edge 44 may be a perforated trailing edge 44 comprising exhaust orifices, as shown in FIG. 3, or the trailing edge 44 may be a non-perforated trailing edge 44 having no exhaust orifices. The turbine blade 41 may also include a root 24 positioned proximate to the platform 22. Coolant generally enters cooling cavities (see FIG. 3) through at least one entrance arranged on a bottom surface 49 of the turbine blade 41.

Turning now to FIG. 3, cooling cavities 60, having a cross sectional size and shape, may extend generally span-wise within the generally elongated turbine blade 41 forming a serpentine, or circuitous cooling network 61 extending and meandering throughout an interior of the turbine blade 41, delivering cooling flow where required to prevent mechanical or thermal failure of the turbine component. In the past, reducing the cross sectional size of the cooling cavities 60 to take advantage of advanced cooling configurations has been very limited because particulate within the cooling air posed a concern for clogging the cooling cavities 60. Furthermore, an improvement in engine performance and an increase in power output resulting from a reduction in the quantity of cooling air required by the advanced cooling configurations has not been realized because of this limitation. A trailing edge cooling cavity 51 can be disposed generally span-wise within the generally elongated turbine blade 41 and may have a portion located proximate to the trailing edge 44. Cooling air enters the cooling network 61 through a plurality of cooling air inlets 62, 63 arranged on a bottom surface 49 of the turbine blade 41. As cooling air snakes through the different cavities 60, the cooling air warms as the process of convection cooling the turbine blade 41 proceeds. Warmed cooling air is exhausted to the working medium through orifices 73 near the top 46 of the turbine blade 41, and through the trailing edge cooling cavity 51.

A centrifugal particle separator 64 is arranged within the interior of the turbine blade 41. While there is a single centrifugal particle separator 64 arranged within the cooling air inlet 63 disclosed, it is conceived and anticipated that each cooling air inlet 62 would be fitted with a centrifugal particle separator 64 filtering inlet air entering the air cooled turbine component. With more effective cooling schemes being devised for air cooled turbine blade 41, i.e. the design of smaller cooling passages, it is desired to have the inlet cooling air filtered as soon as it enters the turbine blade 41. Therefore, the centrifugal particle separator 64 is arranged as near the bottom surface 49 as possible, with placement depending in part on manufacturing capabilities and constraints resulting from space and size limitations within the turbine component. Generally, the centrifugal particle separator 64 has a substantially cylindrical body 65 having two ends. A conical portion 70 is arranged near a first end of the centrifugal particle separator and is in fluid communication with an air outlet, through which unfiltered air exits the turbine blade 41 and is returned to a working medium flowing through a hot gas path (not shown). Filtered cooling air enters a tube 68 arranged near a second end of the centrifugal particle separator 64. The tube 68 is attached to a pathway 69 and returns to a cooling channel 72 at a specified exit 71. Cooling air enters the centrifugal particle separator 64 through a separator inlet port 66 that is arranged on a periphery of the substantially cylindrical body 65 and delivers cooling air approximately tangent to the substantially cylindrical body 65. As illustrated, the inlet port 66 is rectangular in cross section and arranged near the second end of the centrifugal particle separator 64. However, as will be recognized by the skilled artisan, that the inlet port 66 cross section need not be rectangular and can be any cross section that enables cooling air to enter the centrifugal particle separator 64 with a velocity tangent to the substantially cylindrical body 65. As illustrated and in the preferred embodiment, a central axis 50 of the centrifugal particle separator 64 is parallel to the axis of rotation 12 (see FIG. 1) of the gas turbine 11. However, it is not a requirement that the central axis 50 be parallel to the axis of rotation 12 of the gas turbine 11 and the centrifugal particle separator will properly filter cooling air with the central axis 50 in any orientation. Furthermore, it is possible that the cooling network of the turbine blade 41 will prohibit the central axis 50 and the axis of rotation from being parallel.

Figure 4:
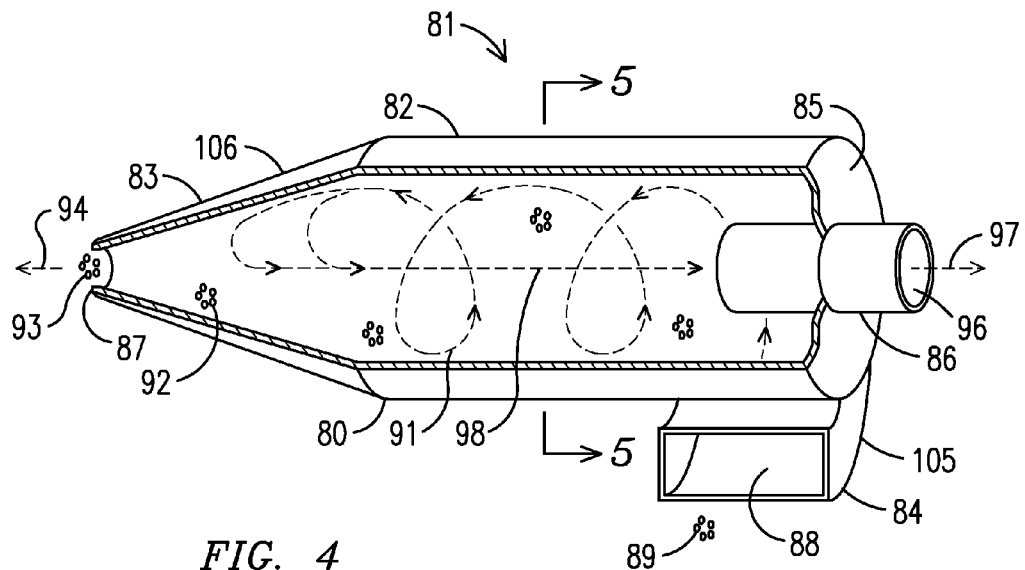
FIG. 4 is an isometric view of a centrifugal particle separator that embodies principles of the present disclosure.
Figure 5:
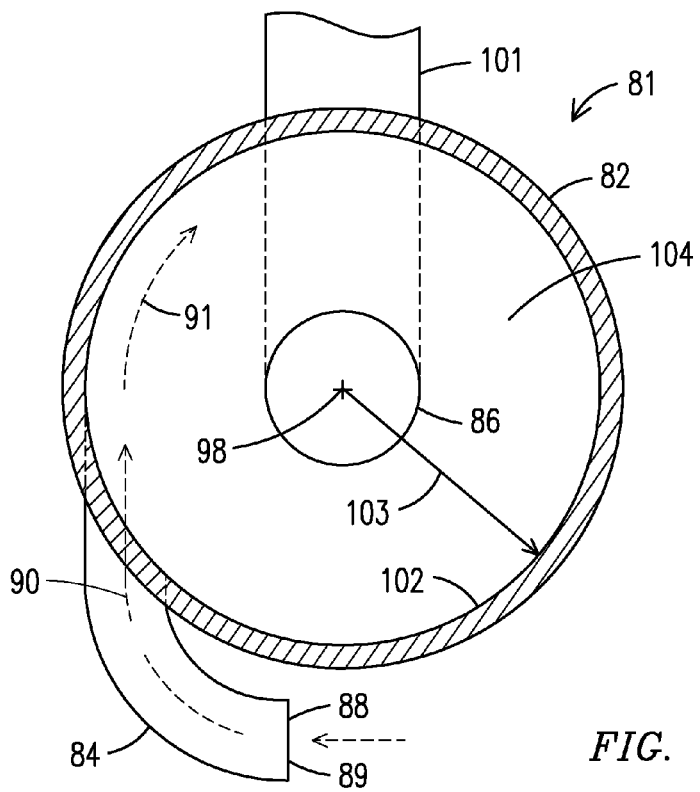
FIG. 5 is a cross section view of the centrifugal particle separator as illustrated in FIG. 4, taken along section line 5-5.

FIG. 4, an isometric view of a centrifugal particle separator that embodies principles of the present disclosure, and FIG. 5, a cross section view of the centrifugal particle separator as illustrated in FIG. 4, taken along section line 5-5, illustrate with more clarity a centrifugal particle separator 81. As discussed above, the centrifugal particle separator 81 has a substantially cylindrical body 82 with an inner wall 102 defined by a radius 103, a first end 80, a second end 85, having a body length extending between the two ends 80, 85. The body length is sized to properly fit within the cooling network 61 (see FIG. 3) of the turbine blade 41, while at the same time effectively filter the inlet cooling air. A conical section 83 is arranged proximate to the first end 80 of the centrifugal particle separator 81. The conical section 83 tapers to a narrow exit portion 87, where a portion of air 94 and filtered microscopic dust particles 93 exit the centrifugal particle separator 81. The filtered microscopic dust particles can be, at a minimum, about as small as 3 microns. An inlet port 84 is arranged proximate the second end 85 and receives a mixture of cooling air 88 and with microscopic dust particles 89 of all sizes. The inlet port 84 is located relative to the substantially cylindrical body 82 so cooling air 88 and microscopic dust particles 89 enter the centrifugal particle separator 81 with a velocity 90 that is directed primarily tangent to the substantially cylindrical body 82. The inlet port 84 can have an inlet port body 105, which leads into the substantially cylindrical body 82 and can be arranged at any peripheral, or circumferential location of the body 82. A cylindrical outlet tube 86 is arranged proximate the second end 85 and is centered relative to the centrifugal particle separator 82, with a center of the cylindrical outlet tube 86 being approximately coincident a central axis 98 of the centrifugal particle separator 82. Filtered air 97 leaves through the outlet tube 86 and exits at a tube end 96, where it returns to the cooling network through a flow-path 101. The centrifugal particle separator has the advantage of having no moving parts.

In operation, the mixture of cooling air 88 and microscopic dust particles 89 enters through the inlet port 84. The mixture enters the centrifugal particle separator 81 with a particular velocity 90 that arises because of a pressure differential in the cooling network. For example, a pressure exists at the inlet port 84 that is greater than a pressure that exists in the cooling channel 72 (see FIG. 3), immediately downstream of the centrifugal particle separator 81. It is this pressure differential that draws the mixture of cooling air 88 and microscopic dust particles 89 into the centrifugal particle separator 81 with a velocity 90 and a magnitude of the velocity that will depend primarily on a magnitude of the pressure differential. Upon entering the substantially cylindrical body 82, the velocity 90 is quickly brought from a non-rotating 90 to a rotating 91 velocity, having a helical trajectory 91 within the substantially cylindrical body 82. This is the result of the mixture impinging on the cylindrical inner wall 102. This rotation creates a centrifugal force, slinging microscopic dust particles 92 within the air flow 88 away from the central axis 98. The microscopic dust particles 92 migrate toward the conical section 83 while the filtered air 97 exits the centrifugal particle separator 81 through the outlet tube 86. Additionally, a decreasing diameter 106 of the conical section 83 (decreasing radius from the central axis 98) forces the cooling air 88 and microscopic dust particles 92 to accelerate in its rotational velocity 91 due to conservation of momentum, thereby subjecting entrained microscopic dust particles 92 to ever-increasing centrifugal forces as the cooling air stream 88 progresses through the centrifugal particle separator 81.

The centrifugal force, $F_C$, is created when the mixture of cooling air 88 and microscopic dust particles 92 enters the input port 84 near the second end 85 of the substantially cylindrical body 82 at an angle, possibly, and is spun rapidly in a vortex 91 (similar to a whirlpool action) from the second end 85 to the first end 80. Therefore, it is seen that due to the centrifugal forces, cooling air 88 quickly accelerates from non-rotating to rotating near the inlet port 84 of the particle separator 81 and as cooling air 88 reaches the conical section 83, which reduces in diameter, the microscopic dust particles 92 are exposed to ever-increasing centrifugal forces as the cooling air 88 progresses through the centrifugal particle separator 81. The centrifugal force decreases linearly with a decrease in the radius 103 of the substantially cylindrical body 82. However, this is more than offset by the centrifugal force increasing with the square of the increasing rotational velocity as seen from the equation:

$$F_C = (M)(r)(\omega)^2$$

where $F_C$ is centrifugal force, M is the microscopic dust particle mass, r is the radius of rotation 103, and $\omega$ is rotational speed. The size of the microscopic dust particles to be filtered from the mixture can be controlled by adjusting the radius 103. For example, a centrifugal particle separator 81 having a smaller radius 103 will have a higher angular velocity $\omega$ because of conservation principles, leading to a higher centrifugal force $F_C$. A higher centrifugal force $F_C$ will sling particles having a smaller mass, i.e. smaller particles, from the mixture. Thus, with knowledge of the mixture velocity 90, the radius 103 of the centrifugal particle separator 81 can be selected to remove microscopic dust particles 92 of virtually any size, or mass. Once the microscopic dust particles 92 have been slung from the mixture, the microscopic dust particles 93 and a small amount of cooling air 94 exit the centrifugal particle separator 81 at and are returned to the working medium (see FIG. 1) at the narrow exit portion 87. The particles 93 are drawn from the centrifugal particle separator 81 by a partial vacuum (i.e. a negative pressure differential) that exists and is maintained between an interior 104 and external to the turbine blade. Particles as small as 3 microns can be removed or filtered from the mixture. Typically, centrifugal particle separator 81 can efficiencies depend on: 1) particle size (particles with larger mass being subjected to greater force), 2) force exerted on the dust particles and, 3) time that the force is exerted on the particles. Thus, design considerations when sizing the centrifugal particle separator 81 can be, but are not limited to, narrow inlets reducing distances traveled by the mixture, a small radius 103 generating a higher centrifugal force, and smooth transition to ensure maximum efficiency.

The ability to filter smaller particles from the mixture permits the cooling channels (see FIG. 3) of the cooling network to be reduced in cross sectional size This is because particles having the potential to clog or block cooling channels reduced in cross sectional size will have been removed from the mixture. Additionally, the cooling channels can be reduced in cross sectional size by an amount proportionate to the minimum particle size filtered from the mixture, provided the component can be properly cooled. For example, if particles having a minimum size of 10 microns were capable of being filtered from the cooling air, an improved filtration system now capable of filtering particles having a minimum size of 3 microns provides that the cross sectional size of the cooling channels can be reduced by some proportionate amount. For this example, the amount could be as much as a 66% reduction, which is the proportionate amount the size of the filtered particles has been reduced. Alternatively, some other function or relation related to the reduction in particle size could be applied to determine how to reduce the cross sectional size of the cooling channels. Examples include a function producing a linear reduction in cross sectional size of the cooling channels when compared to the amount of reduction in particle size, a function producing a non-linear reduction in cross sectional size of the cooling channels when compared to the amount of reduction in particle size, a function scaling the reduction in cross sectional size of the cooling channels when compared to the amount of reduction in particle size, or combinations thereof, can be used to determine the relationship between the reduction in particle size filtered from the mixture and the reduction in cross sectional size of the cooling channels.

Not only can the cross sectional size of the cooling channels be reduced, the number of cooling channels required to cool the component can be reduced. This is because of improvements in cooling technology. The reduction in the cross sectional size of the cooling channels, coupled with advances in cooling technology can lead to a reduction in the amount of cooling air required to cool the turbine components by at least 10%, and in some cases by as much as 20%. With the reduction in the amount of required cooling air, an improvement in the engine efficiency and an increase in the power output of the engine can be realized. The engine efficiency can improve by as much as several tenths of a percentage point and the power output increased by several percentage points.

Air cooled turbine components can be manufactured using a variety of manufacturing techniques and methods. For example, these methods can include, but are not limited to, conventional casting, machining, brazing, and liquid powder metallurgy and are well suited for installation or fabrication of a centrifugal particle separator within the turbine component. The centrifugal particle separator can either be cast into the turbine component, machined into the turbine component, a pocket or void can be cast or machined into the turbine component with a centrifugal particle separator being installed in the pocket or void, or two turbine component halves can have a pocket or void machined into the turbine component with a centrifugal particle separator being installed in the pocket or void and the two halves being joined by a brazing process or liquid powder metallurgy. The above mentioned methods are but a few of the possible manufacturing methods available and the disclosure should not limited in scope to only these methods. As manufacturing technologies improve over time, there can be methods not discussed in this disclosure that are viable methods of practicing the invention.

The invention has been described herein in terms of preferred embodiments and methodologies considered to represent the best mode of carrying out the invention. While at least one exemplary embodiment has been presented in the foregoing detailed description of the disclosure, it should be appreciated that a vast number of variations exist. In fact, a wide variety of additions, deletions, and modifications might well be made to the illustrated embodiments without departing from the spirit and scope of the invention as set forth in the claims. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims

What is claimed is:

1. An air cooled component for use in a combustion turbine engine, the air cooled component comprising:
    a cooling air inlet wherein a volume of cooling air enters the air cooled component;
    a centrifugal particle separator that receives and separates the volume of cooling air into a filtered portion and an unfiltered portion, the centrifugal particle separator being arranged within the air cooled component and proximate the cooling air inlet, comprising;
        a substantially cylindrical body;
        a separator inlet arranged on a periphery of the substantially cylindrical body;
        a conical portion arranged near a first end of the centrifugal particle separator;

an outlet tube arranged near a second end of the centrifugal particle separator that receives the filtered portion, wherein particles having a particle size greater than or equal to a minimum particle size have been removed from the filtered portion by the centrifugal particle separator;

a cooling air network arranged within the air cooled component and receiving the filtered portion of the volume of cooling air, the cooling air network comprising a plurality of flow channels having a cross sectional size reduced by an amount proportional to the minimum particle size removed from the filtered portion of the volume of cooling air; and an air outlet in communication with the conical portion that receives the unfiltered portion of the volume of cooling air and exhausts the unfiltered portion from the cooled component to the flow-path.

2. The air cooled component as claimed in claim 1, wherein the air cooled component is a turbine blade, turbine vane, or a cooled component in the combustion system.

3. The air cooled component as claimed in claim 1, wherein the volume of cooling air enters the cooled component at a first pressure, the unfiltered portion of the volume of cooling air is exhausted to the flow path at a second pressure, the filtered portion of the volume of cooling air is supplied to the cooling network at a third pressure, the first pressure being greater than the second pressure and the second pressure being greater than the third pressure.

4. The air cooled component as claimed in claim 1, wherein the substantially cylindrical body is sized to filter particles having a minimum particle size greater than or equal to 3 microns.

5. The air cooled component as claimed in claim 4, wherein the substantially cylindrical body is sized to filter particles having a minimum particle size greater than or equal to 5 microns.

6. The air cooled component as claimed in claim 1, wherein the centrifugal particle separator is cast into the air cooled component.

7. The air cooled component as claimed in claim 1, wherein the centrifugal particle separator is manufactured by machining the centrifugal particle separator into the air cooled component.

8. The air cooled component as claimed in claim 1, wherein a pocket is cast or machined into the air cooled component and the centrifugal particle separator is installed in the pocket.

9. The air cooled component as claimed in claim 1, wherein the volume of cooling air required by the cooling air network to cool the air cooled component is reduced by at least 10%.

10. A combustion turbine engine, comprising:
a compressor element;
a combustion element;
a turbine element, the turbine element comprising;
a plurality of air cooled turbine components, each air cooled turbine component comprising:
a cooling air inlet where a volume of cooling air enters a cooling network, wherein the cooling network is arranged within an air cooled turbine component;
a centrifugal particle separator that receives and separates the volume of cooling air into a filtered portion and an unfiltered portion, the centrifugal particle separator being located within the air cooled turbine component and near the cooling air inlet in the cooling network, comprising a separator inlet arranged on a periphery of a substantially cylindrical body and an outlet tube arranged towards an end of the centrifugal particle separator receiving the filtered portion of the volume of cooling air and supplying the filtered portion to the cooling network; and
an air outlet arranged at an end of the centrifugal particle separator opposite the outlet tube and receives the unfiltered portion of the cooling air and exhausts the unfiltered portion from the cooled turbine component,
wherein particles having a particle size greater than or equal to a minimum particle size are removed from the filtered portion by the centrifugal particle separator and the cooling network comprises a plurality of flow channels having a cross sectional size reduced by an amount proportional to the minimum particle size removed from the filtered portion of the volume of cooling air.

11. The combustion turbine engine as claimed in claim 10, wherein the centrifugal particle separator further comprises a conical section in communication with the air outlet.

12. The combustion turbine engine as claimed in claim 10, wherein the cooled turbine component is a turbine blade, a turbine vane, or a cooled component in the combustion element, or any combination thereof.

13. The combustion turbine engine as claimed in claim 10, wherein the substantially cylindrical body is sized to filter particles having a minimum particle size greater than or equal to 3 microns.

14. The combustion turbine engine as claimed in claim 13, wherein the volume of cooling air required by the cooling network to cool the air cooled component is reduced by at least 10%.

* * * * *